United States Patent
Iwase et al.

(10) Patent No.: US 6,990,408 B2
(45) Date of Patent: Jan. 24, 2006

(54) IMAGE FORMING SYSTEM AND IMAGE FORMING APPARATUS

(75) Inventors: Akinori Iwase, Kanagawa-ken (JP); Tatsuya Haraguchi, Kanagawa-ken (JP); Kazuhiro Ogura, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/073,894

(22) Filed: Feb. 14, 2002

(65) Prior Publication Data

US 2002/0123839 A1 Sep. 5, 2002

(30) Foreign Application Priority Data

Mar. 2, 2001 (JP) .................................. 2001-058996

(51) Int. Cl.
*G01C 21/00* (2006.01)

(52) U.S. Cl. ..................................................... 701/200
(58) Field of Classification Search ......... 701/200–202, 701/207–209, 211–213; 340/995; 342/357.06, 342/357.09, 357.1, 357.13; 709/203
See application file for complete search history.

(56) References Cited

U.S. PATENT DOCUMENTS

| | | | | |
|---|---|---|---|---|
| 5,197,009 A | * | 3/1993 | Hoffman et al. | 701/200 |
| 6,259,405 B1 | * | 7/2001 | Stewart et al. | 342/457 |
| 6,324,467 B1 | * | 11/2001 | Machii et al. | 701/200 |
| 6,347,278 B2 | * | 2/2002 | Ito | 701/200 |
| 6,366,849 B1 | | 4/2002 | Rychlak | |
| 6,490,521 B2 | * | 12/2002 | Wiener | 701/211 |
| 6,522,971 B1 | * | 2/2003 | Tanaka | 701/209 |
| 2001/0038346 A1 | | 11/2001 | Learman et al. | |
| 2001/0056443 A1 | * | 12/2001 | Takayama et al. | |

FOREIGN PATENT DOCUMENTS

| | | |
|---|---|---|
| DE | 199 27 640 A1 | 1/2001 |
| EP | 0 999 678 A2 | 5/2000 |
| EP | 1 063 494 A1 | 12/2000 |
| GB | 2 298 539 A | 9/1996 |
| JP | 9-280878 A | 10/1997 |
| JP | 10-9888 A | 1/1998 |
| JP | 10-22905 A | 1/1998 |
| JP | 10-103990 A | 4/1998 |
| JP | 10-178674 A | 6/1998 |
| JP | 10-222527 A | 8/1998 |
| JP | 11-64027 * | 5/1999 |
| JP | 2000-324542 A | 11/2000 |

* cited by examiner

*Primary Examiner*—Thu V. Nguyen
(74) *Attorney, Agent, or Firm*—Foley & Lardner LLP (57) ABSTRACT

An image forming system and apparatus are provided which utilizes a portable terminal such as a cellular phone when printing and outputting map data, etc. on a network by separating the operation through the cellular phones from the operation through a terminal printer. The system includes a portable terminal that is connected to a network via a gateway through radio communication and provides a desired map destination data to a server. The server receives the destination data via the network and stores the destination data in a prescribed area. A printer that is connected to the server provides its position data to the server and receives a map data comprising the position data of the printer as a starting point and the destination data as an ending point and prints this map data.

20 Claims, 9 Drawing Sheets

DESTINATION ID = 123456
DESTINATION LONGITUDE = 35.078543
DESTINATION LATITUDE = 135.000000
ARRIVED TIME 1 = 9:00, "ARRIVE 2 HOURS BEFORE OPENING"
ARRIVED TIME 2 = 8:00, "ARRIVE 1 HOUR BEFORE OPENING"
ARRIVED TIME 3 = 9:00, "ARRIVE AT OPENING"
MESSAGE = "PRESENT AT THE SITE FROM 9:00 ~ 17:00"
Password = X3EACE

IMAGE FORMING SYSTEM AND IMAGE FORMING APPARATUS

CROSS REFERENCE

This application is based upon and claims the benefit of priority from the prior Japanese Application No. 2001-058996, filed on Mar. 2, 2001; the entire contents of which are incorporated herein by reference.

BACKGROUND OF THE INVENTION

1. Field of the Invention

The present invention relates to an image forming system for receiving image data provided from a server through a network using a portable terminal such as a cellular phone and outputting this image data, and particularly relates to an image forming system of map data, etc.

2. Description of the Related Art

In recent years, such portable terminals as cellular phones, etc. have come into socially wide use and various environmental conditions of data equipment are changing at present. There are portable equipment that have a display comprising a small LCD and an electronic mail exchanging function or an internet connecting function in addition to cellular phone communication function.

On the other hand, many web sites provide various information pages in may fields on the Internet. Many of the information are prepared by assuming that they are displayed mainly on displays of personal computers. However, there are provided less information pages for portable terminals such as cellular phones. Further, pages other than those pages for portable terminals as described above are prepared using image data comprising extremely larger volume of data than test data in many cases.

Accordingly, when any page other than those for portable terminals on the Internet is read using a portable terminal such as a cellular phone, the page is hardly displayed on a small display of a portable terminal. Moreover, as the memory capacity provided to a portable terminal is small, the memory may become insufficient only when data is received. Further, a system to charge according to volume of data received or transmitted is applied to portable terminals such as cellular phones. Accordingly, when a page data in large volume is received, the communication traffic increases, resulting in drop of communication speed or increase in communication cost.

There are considerably many map data and route guide services on the Internet. These map data and route guide services need a personal computer. Further, a time is required to print data in advance before departure or a position guide service may not be accessed to on the way even when desired. To solve such troubles, a highly functional PDA (Personal Digital Assistant) and cellular phones that have the Internet access function are considered.

For example, as technologies presently available, those technologies that are disclosed in Japanese Patent Application Nos. 10-178674, 9-280878, 10-9888, 10-22905, 10-103990, 2000-324542 are pointed out. In Japanese Patent Application No. 10-178674, the data of the point of departure required for the route guide can be obtained using the position data system of PHS (Personal Handy-phone System). This position data is transmitted to a server which in turn prepares route guide data and return it to PHS. However, accuracy of about 100 m only is available from the position data system of PHS and therefore, such a trouble that one alley is mistaken as a place of departure can be expected.

Further, in Japanese Patent Application No. 2000-324542, it is disclosed that when a destination was input to a data service station installed on a signal pole at an intersection from a portable terminal using a most short distance optical communication function, it is possible to guide around the place wherein the station is installed.

The above-mentioned technologies are to input a destination or a point of departure using a portable terminal, inquire the data service center using a communication function and display guide data on a portable terminal.

However, a merit of a timely road guide that is obtained using a terminal carried by a user is undeniable but the map data and route guide services are required to provide such data as a map, a time table, etc. to a user and there is a limit for portable terminal that is not able to provide a large screen. To solve this problem, in Japanese Patent Application No. 10-222527, a system capable of printing data searched by a portable terminal and thus, a portable terminal is able to use by printing map data, route guide service, map and time table that are in large volume.

However, in the system disclosed in this Japanese Patent Application No. 10-222527, it is necessary to input a destination data and select it from a voluminous printer list. In addition, it is also necessary to search a destination by a cellular phone at a real time near a printer. Further, it is difficult to search several destinations while waiting a coming street-car or a bus and obtain a guide map by printing these data collectively using a printer available at a place where get off a streetcar or a bus or to input data in a preceding day and print on the day.

SUMMARY OF THE INVENTION

It is an object of the present invention to provide an image forming system and an image forming apparatus using a cellular phone, which enables extremely free operability when printing and outputting map data, etc. on a network by separating the operation through a cellular phone time-wise from the operation through a terminal printer.

According to the present invention, there is provided an image forming system comprising a portable terminal connected to a network through a radio communication to transmit a desired destination data via the network by the operation of a user; a server connected to the network to receive the destination data from the portable terminal via the network and store the destination data in a prescribed area; and an image forming apparatus connected to the network to receive map data comprising a position data of the image forming apparatus as a starting point and the destination data stored in the server as an ending point via the network, and form a map image on a recording medium based on the map data.

Further, according to the present invention, there is provided an image forming apparatus in an image forming system including a portable terminal that is connected to a network through a radio communication, a server and the image forming apparatus that are connected to the network, comprising a data supply unit that is connected to the server through the network according to user's operation and supplies a position data of the image forming apparatus and a data to designate destination data stored in a prescribed area to the server; and an image forming unit that is supplied with a map data comprising a position data of the image forming apparatus as a starting point and the destination data as an ending point from the server and according to the supplied map data, forms an image on a recording medium.

DETAILED DESCRIPTION OF THE INVENTION

Figure 1:
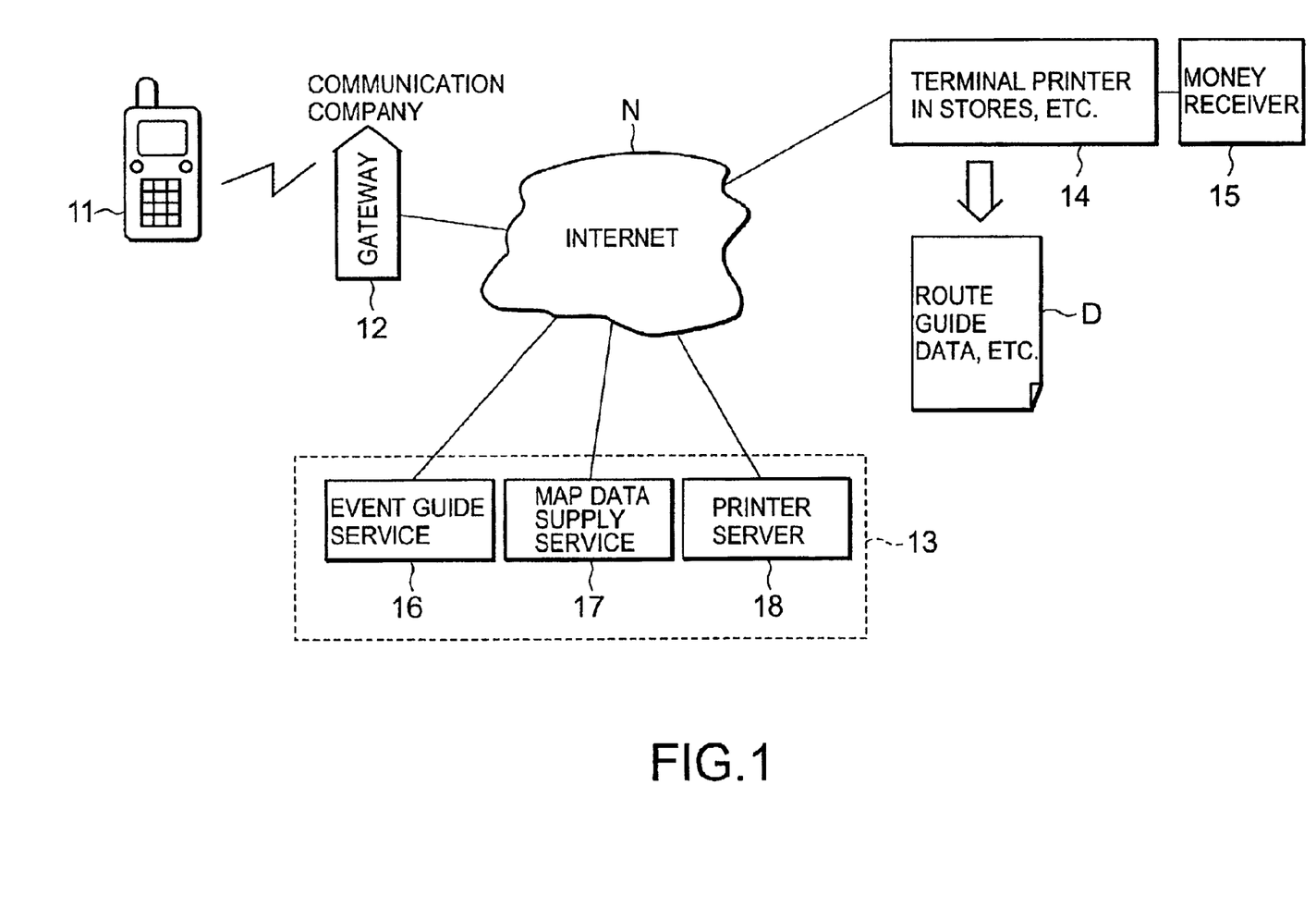
FIG. 1 is a block diagram showing an image forming system in the embodiment of the present invention.
Figure 2A:
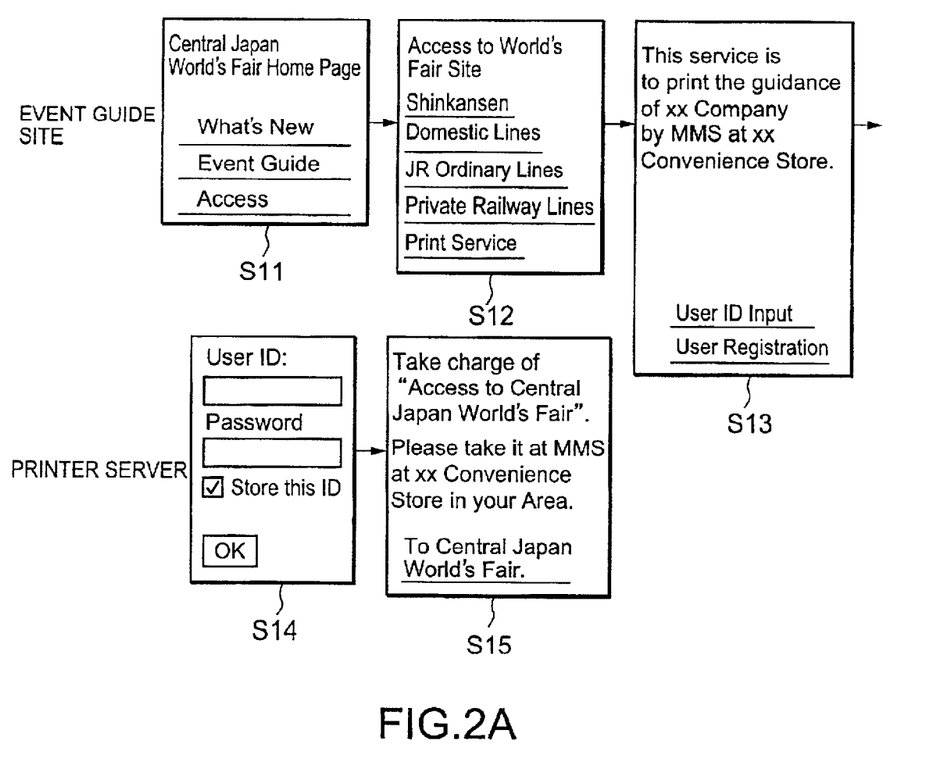
FIGS. 2A and 2B are diagrams showing plural operating screens corresponding to the cellular phone operating steps in the embodiment of the present invention and plural methods for setting destination data of map data.
Figure 3:
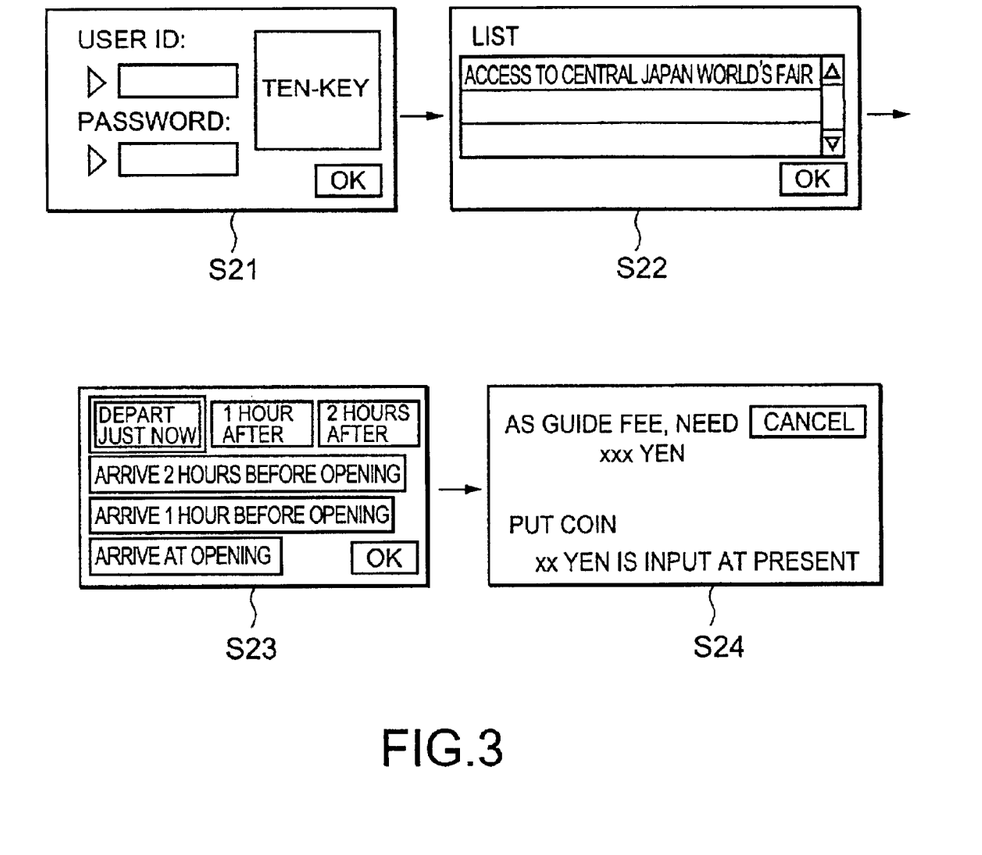
FIG. 3 is a diagram showing one example of the operating screen of a rout guide on the display screen of the cellular phone in the embodiment of the present invention.
Figure 4:
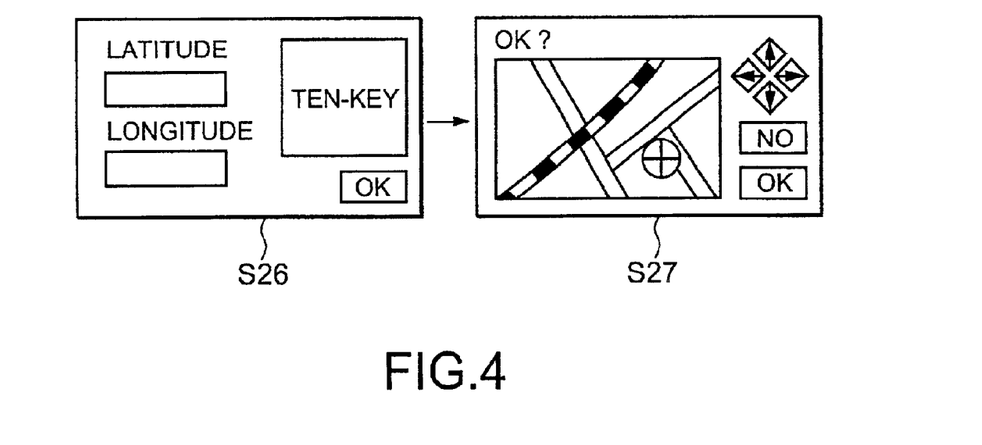
FIG. 4 is a diagram showing one example of GPS setting screens when installing a terminal printer in the embodiment of the present invention.
Figure 5:
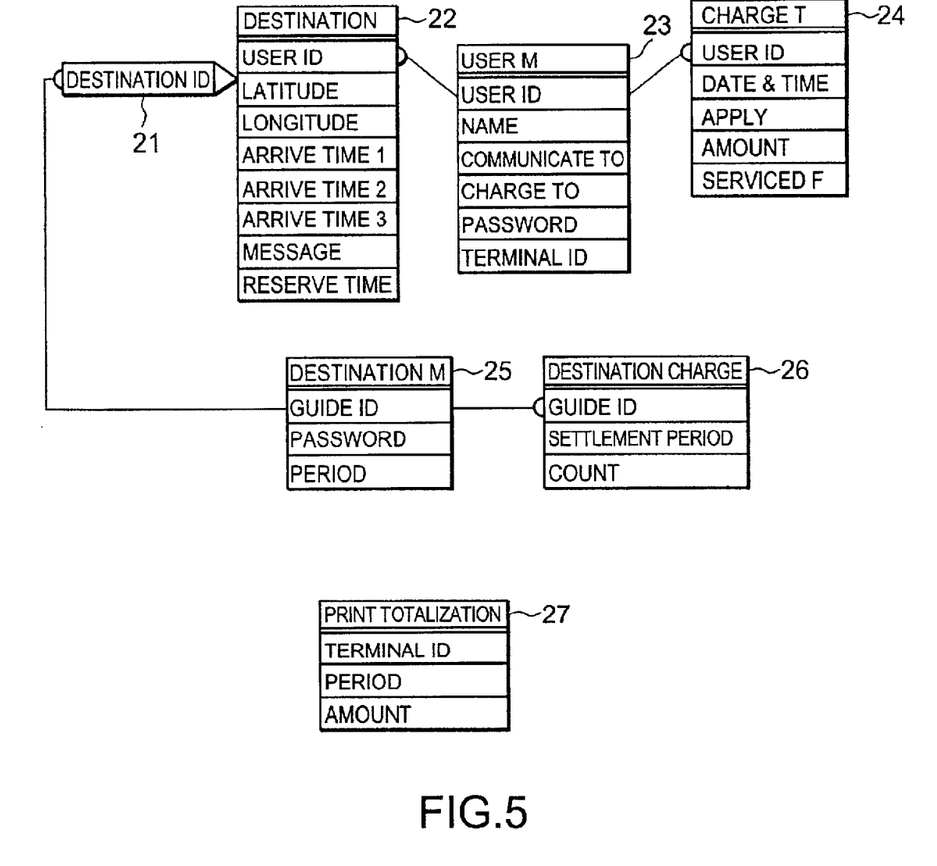
FIG. 5 is a block diagram showing one example of the data structure in a server of the embodiment of the present invention.
Figure 6:
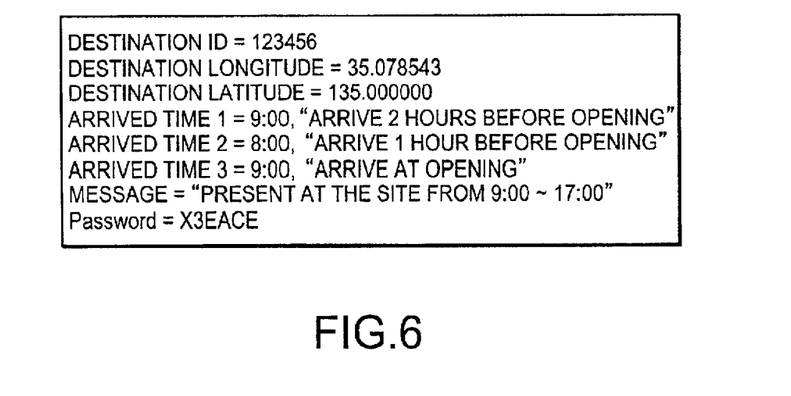
FIG. 6 is a diagram showing one example of a destination registering packet of the image forming system in the embodiment of the present invention.

An image forming system and an image forming apparatus in the embodiment of the present invention will be described below in detail referring to attached drawings. FIG. 1 is a block diagram showing an image forming system in the embodiment of the present invention, FIG. 2 is a diagram showing plural operation screens corresponding to cellular phone operating procedures and plural methods for setting a map data destination in the embodiment of the present invention, FIG. 3 is a diagram showing one example of route guide operation screens on the display screen of cellular phone in the embodiment of the present invention, FIG. 4 is a diagram showing one example of the GPS setting screen when installing a terminal printer in the embodiment of the present invention, FIG. 5 is a block diagram showing one example of the data structure in a server in the embodiment of the present invention, and FIG. 6 is a diagram showing one example of a destination registration packet of the image forming system in the embodiment of the present invention.

<Structure of Image Forming System>

The image forming system in the embodiment of the present invention is a portable terminal that has a function to make the access to the Internet N through the radio communication as shown in FIG. 1. In this embodiment, the explanation will be made using a cellular phone 11 as a portable terminal; however, not restricted to this but other portable terminals that are connectable to the Internet N such as portable mail terminals or PDA (Personal Digital Assistance) are usable. The cellular phone 11 has a gateway 12 of a communication carrier that makes the radiocommunication. The gateway 12 has a function to communicate with other cellular phones and a function to connect to the Internet N. Thus, the cellular phone 11 is able to connect to the Internet N through the gateway 12.

The cellular phone 11 that is able to make the access to the Internet N is connected to a server 13 on the Internet N via the radiocommunication. The server 13 has at least such functions as, for example, an event guide service 16, a map data supply service 17, and a printer server 18.

Further, the image forming system of the embodiment of the present invention has a terminal printer 14 that is installed in such places as stores, etc. that have a communication function to make the access to the Internet N and a money receiver 15 that is connected to the terminal printer 14 and urges a user to put a prescribed charge into it.

The cellular phone 11 described above has a control function by a built-in microcomputer system (not shown). Under the control of this control function, radio waves given from an antenna terminal are received, demodulated by a demodulator (not shown), converted into voice signal and image data, and the voice signal is reproduced through a speaker and image data are displayed on a display. At the same time, under the control of this control function, operation signals corresponding to the operation buttons such as numerical figures, etc. and voice signals obtained through a microphone are modulated by a modulator and output through the antenna terminal as radio wave in prescribed frequency. Further, the operating procedures that are a special feature of the present invention explained in a flowchart shown later are stored in a memory as a processing program of the control functions described above.

Further, the gateway 12 of a communication carrier is also a computer system that is controlled by the control function defined by a processing program. In addition, the server 13 to provide map data supply service provided on the above-mentioned Internet N is also a computer system given with a communication function controlled by the control function defined by a processing program. Here, the server 13 has, for example, data structures 21~27 in the server as shown in FIG. 5.

The above-mentioned terminal printer 14 provided in such stores as convenience stores is an image forming apparatus that is connected to the Internet N through a telephone line and has a communicating function, though its structural details are omitted. This image forming apparatus is composed of, for example, an interface (not shown) that has a communicating function, an image creating unit for creating prescribed image data from given image data, a printer engine unit for forming an image corresponding to image data on a recording medium such as copy paper, etc., and a control unit that has a memory area to store a control program for specifying process actions including operating process peculiar to the present invention that is specified in a flowchart described later.

Further, when installed in such stores as convenience stores, etc., this image forming apparatus is installed by detecting latitude and longitude data by the GPS (Global Positioning system) on the setting screen (S26 and S27) shown in FIG. 4. Thus, when requesting the print, it is possible to provide position data that becomes the start point of map data to a print server.

Further, the money receiver 15 has the interface (not shown) that is connected to the terminal printer 14 and transmits/receive control data. Under the control of the controller that has a memory area to store a control program for specifying process actions including operating process that is peculiar to the present invention specified in a flowchart described later, the money put into the money receiver by a user is detected according to the indication on the display urging a user to put a charge, the money is stored and a change is output properly.

The image forming system of the embodiment of the present invention executes the process operations explained below with flowcharts using the units described above. A destination is input from the cellular phone 11 and reserves it in the print server. Thereafter, by operating the terminal printer 14, the destination is taken out from the print server and a road guide print to the destination from the place of the terminal printer 14 installed is out put based on the latest data.

<Operation of Image Forming System>

Figure 7:
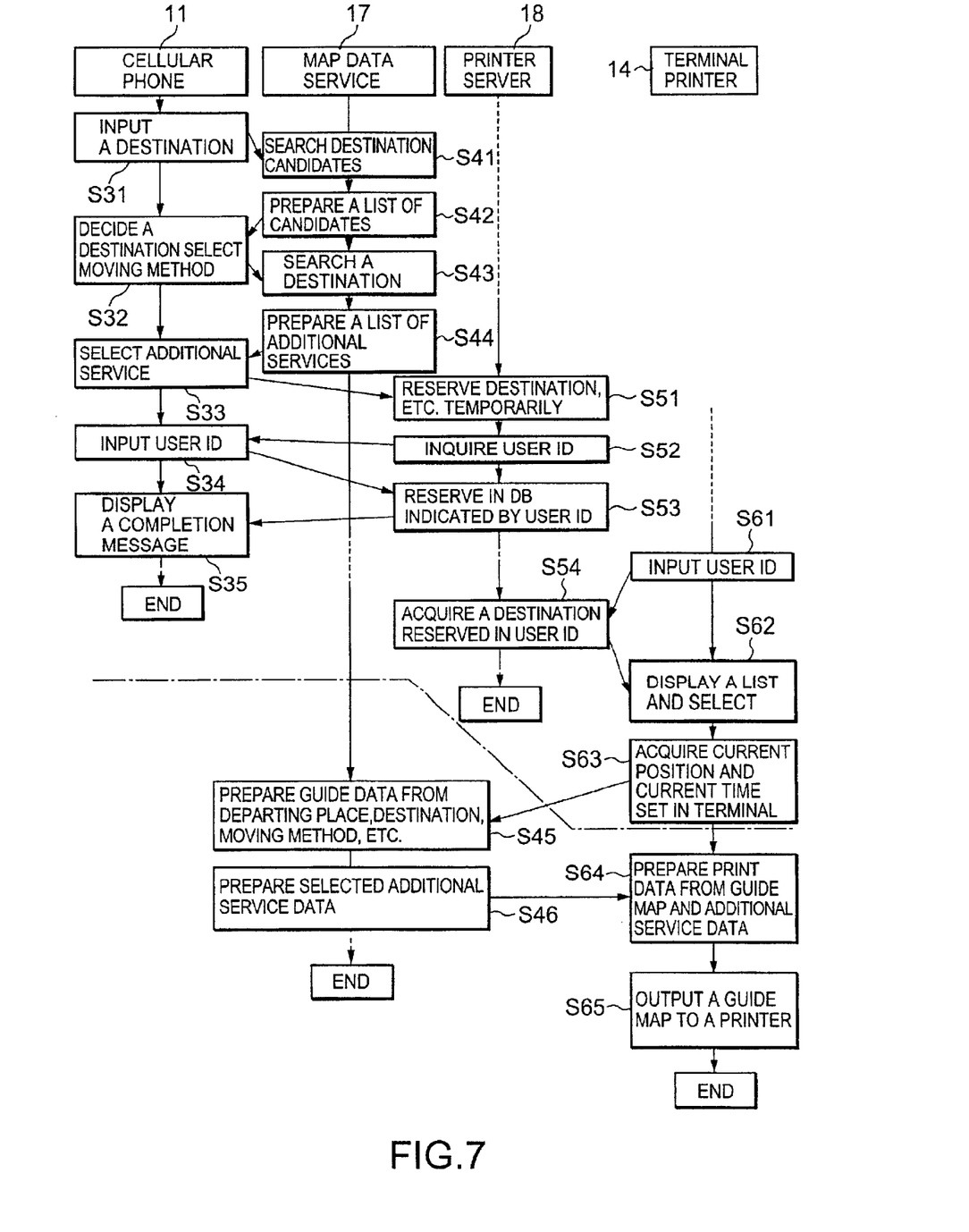
FIG. 7 is a flowchart showing the operations from the setting of the image forming system to the map image outputting in the embodiment of the present invention.
Figure 8:
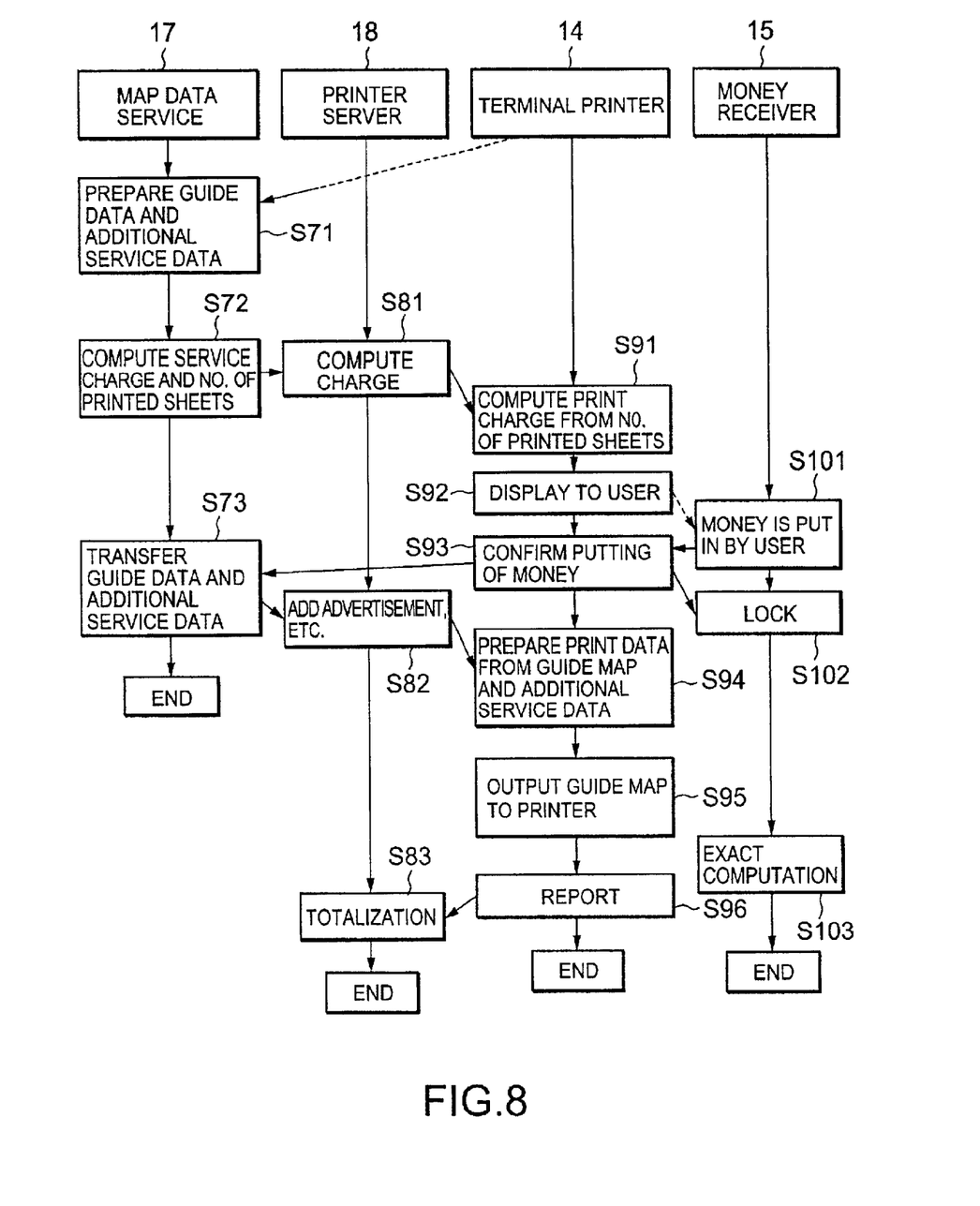
FIG. 8 is a flowchart showing a charge collection process by a money receiver of the image forming system in the embodiment of the present invention.
Figure 9:
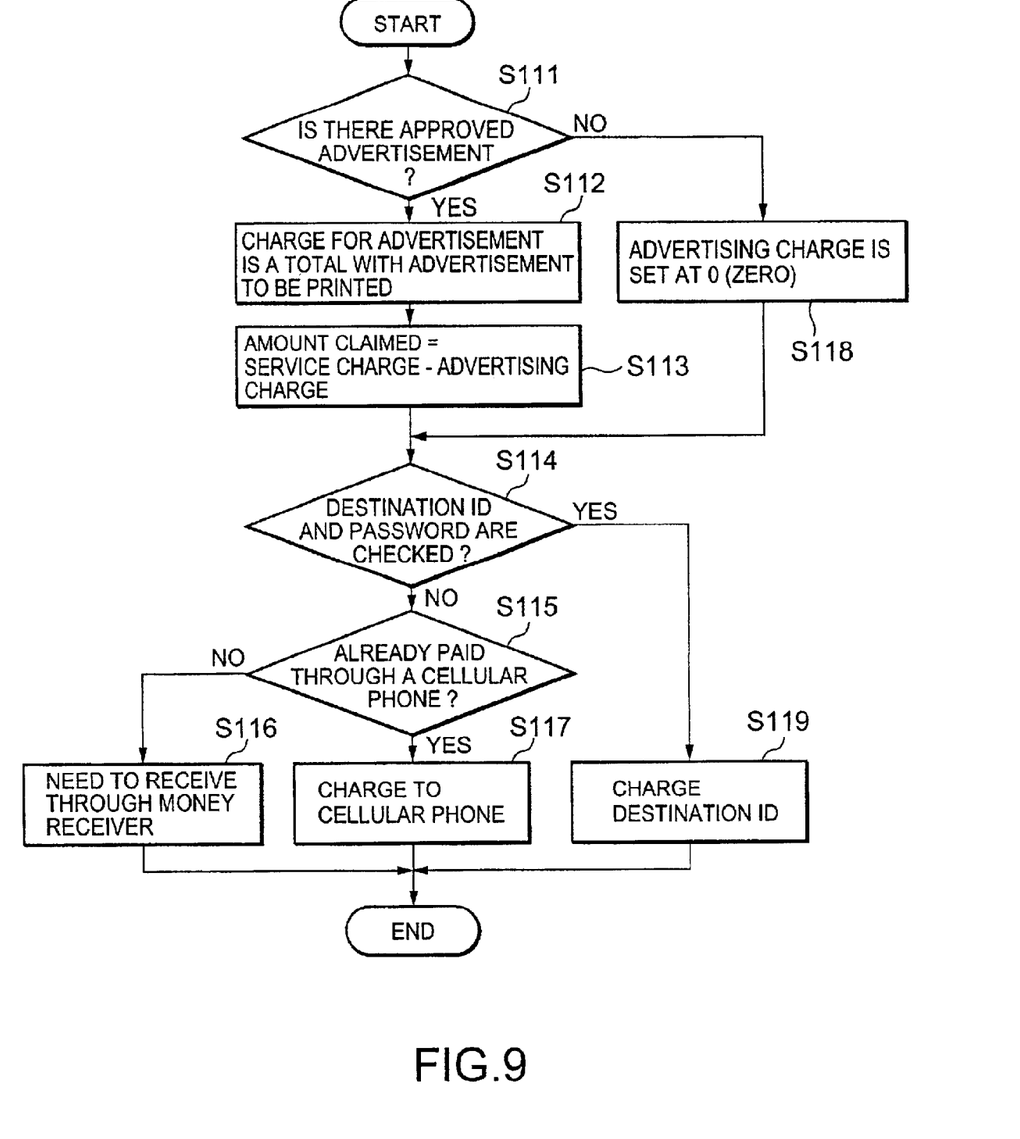
FIG. 9 is a flowchart showing a charge requesting process of the image forming system in the embodiment of the present invention.
Figure 10:
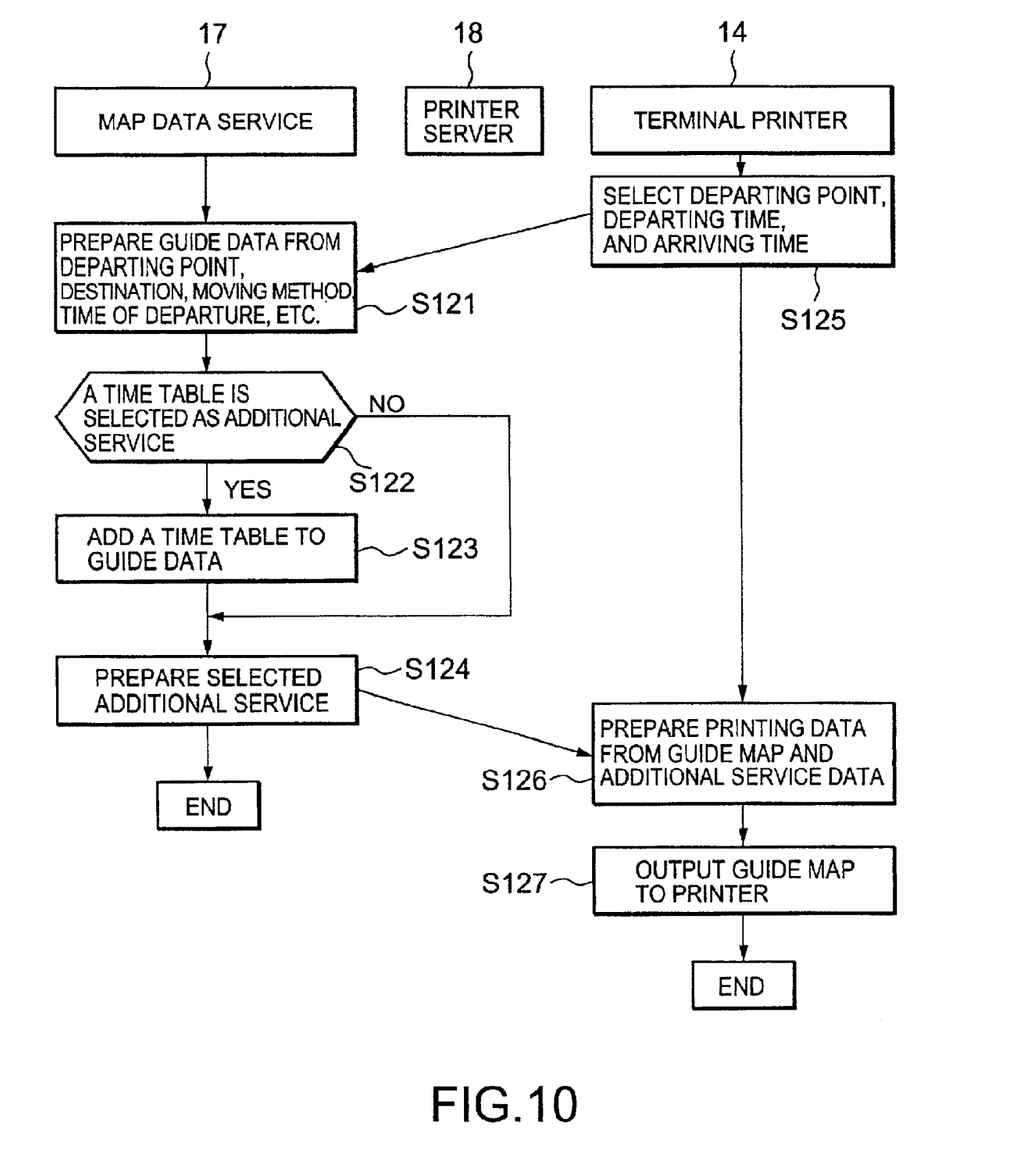
FIG. 10 is a flowchart when providing additional service and printing based on a time of the image forming system in the embodiment of the present invention.
Figure 11:
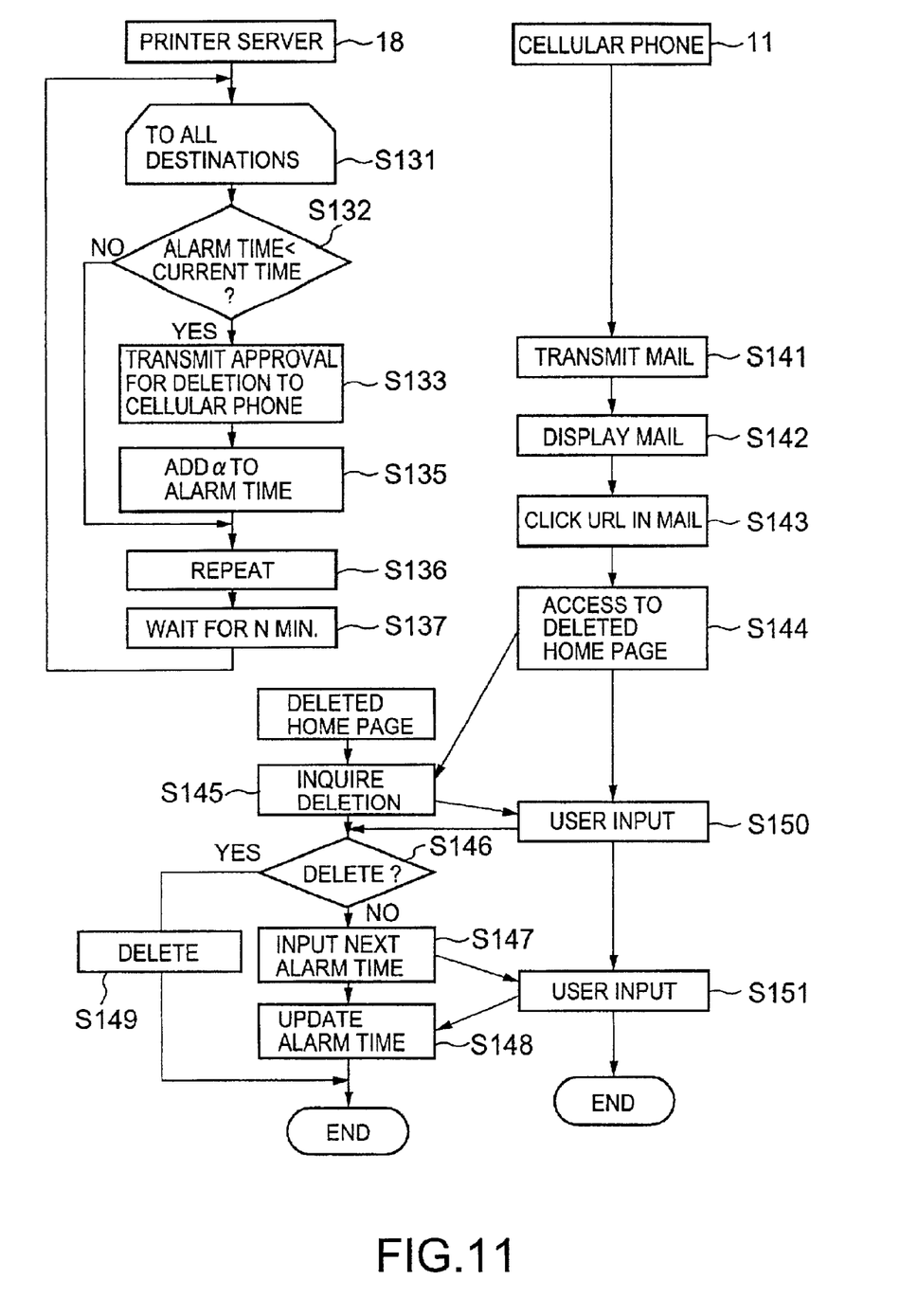
FIG. 11 is a flowchart when executing a warning process according to the time elapse of a printer server in the embodiment of the present invention.

The characteristic process operations of the image forming system described above will be explained in detail using the flowcharts. FIG. 7 is a flowchart showing the operations from the set-up to the map image output of the image forming system of the embodiment of the present invention, FIG. 8 is a flowchart showing the charge collection process by the money receiver, FIG. 9 is a flowchart showing the charge requesting process, FIG. 10 is a flowchart when providing and printing an additional service based on a time of the image forming system of the embodiment of the present invention, and FIG. 11 is a flowchart when executing the warning process for the time elapse of the print server.

The image forming system of the embodiment of the present invention makes it possible to separate the operations for the cellular phone 11 and the terminal printer as shown below in the flowchart shown in FIG. 7. That is, when the cellular phone 11 is first started and then, connected to the Internet N through the gateway 12 by a communication carrier and accessed to the server 13 that provides a map data supply service, a display shown by S11 in FIG. 2A appears and when the underline portion is clicked, a destination is input (S31).

Figure 2B:
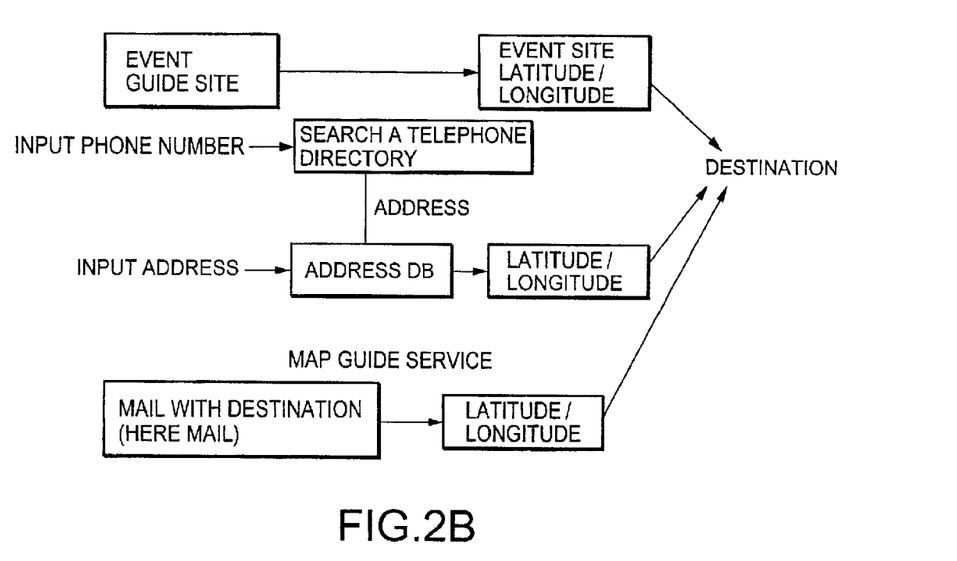

Further, when the event guide site is accessed here as shown in FIG. 2B, it is possible to input a destination data by inputting a phone number or a residence or by specifying a mail with a destination other than a latitude and longitude as a destination data.

Thus, in the map data supply service 17, destination candidates are searched (S41), a table of candidates is prepared (S42) and a moving method is selected by deciding a destination (S32). Corresponding to this, in the map data supply service 17, a destination is searched(S43) and a table of additional services is prepared (S44). When a user selects an additional service (S33), in the printer server 18, data including a destination are saved in a memory area temporarily (S51). As a result of this saving process, the operation from the terminal printer 14 becomes possible later.

Thereafter, in the printer server 18, a user ID is inquired (S52) and a user is urged to input of the user ID by the cellular phone as shown in the operation screen S14 in FIG. 2 (S34). When a user ID is input, it is saved in a data base shown by the user ID in the printer server 18 (S53). According to this, a completion message is displayed as shown in Step S15 in FIG. 2 (S35). Further, when this user ID and a password are once input, the input of them can be omitted from the next access.

Further, when the printer server 18 is accessed through the terminal printer 14 provided in a convenience store, etc. and a user ID is input (S61), the terminal printer 14 displays a table of services and makes the selection (S62) after acquiring the destination data saved corresponding to the user ID (S54). Corresponding to this selection, a current position and a current time that are set by the GPS, etc. are acquired in the terminal printer (S63). The map data supply service 17 prepares guide data from a point of departure, a destination, a moving method, etc. (S45). Thereafter, when a selected additional service data is prepared, this data is supplied (S46) and in the terminal printer 14, print data are prepared from a guide map and additional service data (S64), guide map, etc. are formed on a copy paper by the printer 14 and output (S65).

As described above, when various data including destination data of map such as a destination ID, etc. shown in FIG. 6 are set by the cellular phone 11 and stored in a memory area by the printer server 18, the terminal printer 14 requests map data of a place of the terminal printer 14 as a starting point and a user input destination as a terminal point to the map data supply service site through the Internet N. The map data supply service site prepares guide data added with latest data at this time and returns the data to the terminal printer 14. The terminal printer 14 receives this data, prints the data and provides it to a user. Thus, the present invention provides an image forming system that is able to make an operating environment convenient for user by executing complicated operation to specify map data, etc. by a cellular phone using a sufficient time according to convenience of user and the operation of the terminal printer 14 in a store where it tends to come confuse very easily.

Next, the operations including setting, requesting and adjustment of charges accompanied with services of map data, etc. provided will be explained using a flowchart as shown in FIG. 8.

In FIG. 8, when guide data and additional service data are prepared by the map data supply service 17 (S71), a service charge and the number of prints are computed (S72). Corresponding to this, the print server 18 computes a charge (S81) and a print charge is computed from the number of printed sheets in the terminal printer 14 (S91). Then, these charges are displayed to a user (S92). The money receiver 15 detects the putting of money into the slot (S101 and S93), the map data supply service 17 transfers guide data and additional service data (S73) and the printer server 18 adds an advertisement, etc. (S82). Further, when the terminal printer 14 detects the input of money (93), the money receiver 15 locks the slot (S102) and makes the accurate calculation (S103).

On the other hand, in the terminal printer 14, print data is prepared from guide map and additional service data (S94), the guide map is output to the printer (S95) and further, it is reported (S96) and the printer server executes the totalization process (S83).

Further, in the image forming system of the embodiment of the present invention, a charge can be requested as the fee for a telephone call not limiting to the money receiver 15 only. That is, when there is no approved advertisement, a charge for advertisement is made zero (S118) and when there is an advertisement (S111), an amount of a fee for printing the advertisement (S112) and an amount to be claimed is decided by deducting a fee for advertisement (S113). Then, when a destination ID and a password are confirmed (S114), an amount claimed is charged to a destination ID in a sense of charging a sponsor of the server (S119).

However, when this charge cannot be claimed (S114), if a charge was already paid through a cellular phone 11, a charge is made payable through a cellular phone 11 (S117). However, if not paid through a cellular phone 11, a control data is supplied to the money receiver in order to collect a charge through the money receiver (S116).

Next, a service relative to a time schedule, etc. that are attached to a map data will be explained below. When a point of departure and a time of departure, a time of arrival are selected in the terminal printer 14 (S125), the map data supply service 17 prepares a guide data from the point of departure, a destination, a moving method and a time of departure (S121). Thereafter, if a time schedule was selected as an additional service (S122), a time schedule is added to the guide data according to the point of departure, a time of departure and a time of arrival that supplied from the terminal printer 14 (S123). Further, the selected additional service is prepared and provided to the terminal printer 14 (S124).

In the terminal printer 14, this additional service data is received, print data is prepared from a guide map and additional service data (S126), and the guide map with a time schedule, etc. attached are printed and output (S127).

Here, there is a method to make this time of departure to a time when a signal was sent from the terminal printer 14 or it may be made to a time after a prescribed time elapsed from this time. Further, it may be a time elapsed by a time definitely given from a user like 2 hours later, etc.

Lastly, as indicated in the flowchart shown in FIG. 11, it is preferred to warn that various data that are set by a user of the cellular phone 11 are deleted with the elapse of a prescribed time. That is, in the printer server 18, it is judged whether the alarm time is passed over (S132) for all destinations (S131) currently and if passed over, a signal allowing the deletion is sent to the cellular phone (S133). Then, a certain time is added to the alarm time (S135) and after waiting for N min. by repeating this, returned to the first Step S (S136, 137).

In the cellular phone 11, when a mail is received (S141), the mail is displayed (S142). When a user clicks the URL of this mail (S143), a home page is accessed to for deletion (S144).

On the deleting home page, a user of the cellular phone 11 is inquired for the deletion and exchanging a control signal between the cellular phone 11 and the deletion home page. When the deletion is directed (S146), the alarm is deleted (S149) and if not, a next alarm time is input (S147) and the alarm time is updated (S148 and S151).

Thus, when a certain time passed, stored data including destination data, etc. are deleted and therefore, the memory area can be secured.

According to the image forming system of the present invention as described above, when destination data, etc. are received from a portable terminal, required data are not specified immediately but they are once stored in a storage area. Then, a user operates the terminal printer 14 and supplies, prints and outputs required image based on this stored data and terminal printer data. Thus, this invention is able to provide an image forming system that is capable of executing complicated operation to specify map data, etc. in a sufficient time for convenience of a user through a cellular phone and the operation through a terminal printer very simply in a store wherein it tends to become confuse and thus, the operating environment is made convenient for user.

What is claimed is:

1. An image forming system comprising:
a portable terminal connected to a network through a radio communication to transmit a desired destination data via the network by the operation of a user;
a server connected to the network to receive the destination data from the portable terminal via the network and store the destination data in a prescribed area, the server storing the destination data in the prescribed area corresponding to a user ID that is set inputted by the user who operates the portable terminal; and
a printer connected to the network to receive map data comprising a position data of the printer as a starting point and the destination data, which corresponds to the user ID set by the user and stored in the prescribed area of the server, as an ending point via the network, and print a map image on a recording medium based on the map data when the user ID is inputted to the server through the printer.

2. The image forming system according to claim 1, wherein the printer transmits the position data of the printer that is set by the GPS (Global Positioning System) to the server and receives the map data comprising the position data of the printer as the starting point and the destination data as the arriving point from the server, and print the map image on the recording medium based on the received map data.

3. The image forming system according to claim 1, wherein the server stores the destination data in the prescribed area corresponding to a the user ID and a password that are set by the user who operates the portable terminal.

4. The image forming system according to claim 3, wherein the user ID and the password are once set by the user who operates the portable terminal, the server is not required to set the user ID and the password for the second time and thereafter.

5. The image forming system according to claim 1, further comprising:
a money receiver connected to the printer to urge the user to put money corresponding to the map data provided and an image formed in response to the direction by the user to print the map image on the recording medium.

6. The image forming system according to claim 1, wherein the printer further includes a charging unit to charge a part of the fee for telephone calls by the portable terminal for the map data provided and image formed in response to the direction by the user to form the map image on the recording medium.

7. The image forming system according to claim 1, wherein the printer further includes a charging unit to charge a sponsor of the server for the map data provided and image formed in response to the direction by the user to form the map image on the recording medium.

8. The image forming system according to claim 1, wherein the printer forms an image with an advertisement of a prescribed facilities available in a guide route of the map data attached and includes a charging unit to charge a sponsor a fee for the advertisement of the facilities corresponding to the map data provided and the image formed when the printer is directed by a user to form the map data on the recording medium corresponding to the map data.

9. The image forming system according to claim 1, wherein the printer further includes a unit to set the current time of the printer to the server as a departure time for utilizing the map data, based on a users s instruction to print an image the recording medium responding to the map data.

10. The image forming system according to claim 1, wherein the printer further includes a unit to set a time elapsed by a prescribed time from the current time of the printer to the server as a departure time when utilizing the map data, based on a user's instruction to print an image on the recording medium responding to the map data.

11. The image forming system according to claim 1, wherein the printer further includes a unit to set a time elapsed by a prescribed time from the current time of the printer to the server as a departure time for utilizing the map data, based on a user's instruction to print an image on the recording medium responding to the map data, and when the map data comprising the position data of the printer as the starting point and the destination data as the ending point is supplied from the server, prints the map image based on the map data and a time schedule corresponding to the departure time on the recording medium.

12. A printer in an image forming system including a portable terminal that is connected to a network through a radio communication, a server and the printer being connected to the network, comprising:

a data supply unit that is connected to the server through the network according to user's operation and supplies to the server a position data of the printer and a data to designate destination data, which corresponds to a user ID inputted by the user and which is stored in a prescribed area; and a printer unit that is supplied with a map data, comprising the position data of the printer as a starting point and the destination data as an ending point, from the server and according to the supplied map data, prints an image corresponding to the map data on a recording medium when the user ID is inputted to the server through the printer.

13. The printer according to claim 12, wherein the printer unit supplies the position data of the printer that is set by a GPS (Global Positioning System) to the server and is supplied the map data comprising the position data of the printer as the starting point and the destination data as the ending point from the server and prints the image on the recording medium correspondingly.

14. The printer according to claim 12, further comprising:

a money receiver that urges a user to put money therein according to the map data provided in response to the direction by the user for the map data printed on the recording medium.

15. The printer according to claim 12, further comprising:

a charging unit to charge as a part of the fee for telephone calls of the portable terminal according to the map data provided and the image formed in response to the direction by the user for the map data printed on the recording medium.

16. The printer according to claim 12, further comprising:

a charging unit to charge a sponsor of the server according to the map data provided and the image formed in response to the direction of the user for an image printing of the map data on the recording medium.

17. The printer according to claim 12, further comprising:

a unit that prints an image with an advertisement of a prescribed place in the guide route of the map data when a direction by the user for printing the image on the recording medium according to the map data is received and charges a sponsor of the place according to the map data provided and the image printed.

18. The printer according to claim 12, further comprising:

a unit to set the current time of the printer in the server as a time of departure when utilizing the map data when a direction is received from the user to print the image on the recording medium according to the map data.

19. The printer according to claim 12, further comprising:

a unit to set a time elapsed by a prescribed time from the current time of the printer in the server as a time of departure when utilizing the map data when a direction is received from the user to print the image on the recording medium according to the map data.

20. The printer according to claim 12, further comprising:

a unit to set a time elapsed by a prescribed time from the current time of the printer in the server as a time of departure when utilizing the map data when a direction is received from the user to print the image on the recording medium according to the map data; and a unit to form the map data and a time table corresponding to the set time of departure on the recording medium when the map data comprising the position data of the printer as the starting point and the destination data as the ending point is supplied.

* * * * *